United States Patent [19]

Pluim

[11] Patent Number: 5,466,500
[45] Date of Patent: Nov. 14, 1995

[54] DOUBLE-COATED PRESSURE-SENSITIVE ADHESIVE TAPE INCORPORATING A STRONG, FLEXIBLE THREAD

[75] Inventor: Arthur W. Pluim, Stillwater, Minn.

[73] Assignee: Minnesota Mining and Manufacturing Company, St. Paul, Minn.

[21] Appl. No.: 198,229

[22] Filed: Feb. 16, 1994

[51] Int. Cl.⁶ ............................................ C09J 7/02
[52] U.S. Cl. ................ 428/40; 52/202; 428/294; 428/295; 428/343; 428/354
[58] Field of Search ........................ 428/40, 294, 295, 428/343, 354, 261; 52/202

[56] References Cited

U.S. PATENT DOCUMENTS

| | | | |
|---|---|---|---|
| 2,750,315 | 6/1956 | Tierney | 428/354 |
| 2,753,284 | 7/1956 | Pahl | 428/354 |
| 3,276,669 | 10/1966 | Vilutis | 229/51 |
| 3,338,404 | 8/1967 | Becker et al. | 206/65 |
| 3,352,480 | 11/1967 | Forman | 229/51 |
| 3,456,780 | 7/1969 | Forman | 206/46 |
| 3,499,260 | 3/1970 | Forman | 53/14 |
| 3,504,844 | 4/1970 | Stark et al. | 229/51 |
| 3,526,315 | 9/1970 | Killian | 206/46 |
| 3,550,764 | 12/1970 | Tigner | 206/46 |
| 3,593,912 | 7/1971 | Collura et al. | 229/71 |
| 3,668,061 | 6/1972 | Forman | 161/175 |
| 4,629,663 | 12/1986 | Brown et al. | 428/343 |
| 4,699,842 | 10/1987 | Jorgensen et al. | 428/343 |
| 5,093,187 | 3/1992 | Engelmann et al. | 428/212 |
| 5,190,798 | 3/1993 | Bloch | 428/354 |

FOREIGN PATENT DOCUMENTS

43020/85  5/1985  Australia .

Primary Examiner—Jenna L. Davis
Attorney, Agent, or Firm—Gary L. Griswold; Walter N. Kirn; William L. Huebsch

[57] ABSTRACT

An improved window insulating kit of the type including a transparent plastic film and a double-coated pressure-sensitive adhesive tape by which a piece of the plastic film can be mounted and stretched taut across a window casement. Excess plastic film can then be trimmed off by pulling a strong, flexible, low-elongation thread that is incorporated into the tape. The thread can be made of highly oriented polymeric filaments and preferably is from 0.08 to 0.4 mm in diameter so that it can cut cleanly through the plastic film.

20 Claims, 1 Drawing Sheet

DOUBLE-COATED PRESSURE-SENSITIVE ADHESIVE TAPE INCORPORATING A STRONG, FLEXIBLE THREAD

FIELD OF THE INVENTION

The invention is primarily concerned with a kit for adhering a piece of transparent plastic film across the casement (or frame or molding) of a window to reduce the loss of heat through the window. More specifically, the invention concerns double-coated pressure-sensitive adhesive tape by which the plastic film can be adhered to the edges of the casement.

1. Description of the Related Art

The R-Value of an average single-pane window can be increased more than 85% by covering the window with a transparent plastic film such as polyethylene that is sealed to the window casement by double-coated pressure-sensitive adhesive tape. To do this, varieties of a "Window Insulator Kit" of film and tape are currently being sold by the company to which this application is assigned. Because the transparent film of such a kit is stretchable and heat-shrinkable, wrinkles can be removed by stretching the film across the window casement and/or by using a hair dryer or other heat gun to shrink the film to tautness, thus making the window covering almost invisible. The tape of the kit also is transparent and hence almost invisible.

Instructions packaged with each kit suggest that excess window film can be trimmed off with a scissors or razor blade. Unfortunately, precise trimming is difficult without occasional tearing that can destroy the air-sealing function of the window film. There also is a hazard that the razor blade might damage the window casement and adjacent wall areas.

Each tape of the aforementioned "Window Insulator Kit" has a flexible carrier web such as cellophane or cellulose acetate, each major surface of which bears a layer of pressure-sensitive adhesive. The tape is furnished in roll form and has a disposable low-adhesion liner. The exposed layer of adhesive has been specifically designed to adhere strongly to typical window casement surfaces without becoming permanently bonded thereto, thus allowing the tape to be peeled away at the end of the heating season without damaging the casement surfaces and without leaving unsightly adhesive residue. After lengths of tape have been applied to casement surfaces, the liner is peeled away to expose an underlying adhesive layer that has been specifically designed to adhere strongly to the transparent plastic film. Such a double-coated tape is disclosed in coassigned U.S. Pat. No. 4,699,842 (Jorgensen et al.).

2. Other Prior Art

It is known to use a pressure-sensitive adhesive tape or an element of a pressure-sensitive adhesive tape as a tear strip to open a package. See, for example, U.S. Pat. No. 3,504,844 (Stark et al.) which shows in FIG. 1 an adhesive tape 8 that has been positioned to overlie the joint between adjacent carton flaps 10. A string or filament 9 extends along the longitudinal median of the gummed surface of the tape. Upon being pulled, the filament 9 cuts through the tape backing to allow the carton flaps to open. FIG. 4 of Australian Provisional Specification No. 43020/85 dated May 27, 1985 (Beggs) shows a sealing tape 40 to which a shear member 41 is affixed "along the longitudinal symmetry line of the tape 40. The sealing tape 40 may comprise a substrate of plastics or paper based material having a layer of adhesive applied thereto. The shear member 41 may comprise filament, strand, thread, band, strip or wire which is suitable for cutting through the substrate of the sealing tape" (page 7, lines 11–18). FIG. 5 of the Beggs tape suggests that the tape 40 can seal the flaps of a carton 50 in the same manner as in the Stark patent, thus allowing the carton flaps to open when the shear member 41 is pulled to cut through the tape backing. It also is known that a tear strip or tape, after being secured to a package by an adhesive, can be pulled to tear the material of which a package is made. See, for example, U.S. Pat. No. 3,526,315 (Killian) which says that suitable tear strips include "metal wire reinforced paper strips, metal wire reinforced fabric strips, metal wire reinforced plastic strips, unreinforced but relatively stiff metal or plastic wires or ribbons" (col. 1, lines 60–65). Tear strips that are thread-like are described in U.S. Pats. No. 3,276,669 (Vilutis), No. 3,338,404 (Becket et al.), No. 3,352,480 (Forman), No. 3,456,780 (Forman), No. 3,499,260 (Forman), No. 3,550,764 (Tigner), and No. 3,668,061 (Forman).

U.S. Pat. No. 5,093,187 (Engelmann et al.), like patents cited in the preceding paragraph, concerns a tear strip which can be adhesively bonded to materials used to make packages that can be opened by pulling the tear strips. The tear strip of the Engelmann patent is tapelike, preferably having a strip width of 2–8 mm and a thickness of 50–150 mm.

SUMMARY OF THE INVENTION

The present invention provides a window insulating kit for adhering a piece of transparent plastic film across the casement (or frame or molding) of a window, which kit (like that of the aforementioned "Window Insulator Kit") includes a double-coated pressure-sensitive adhesive tape by which the plastic window film can be adhered to the the casement. The window insulating kit according to the invention differs from that of the "Window Insulator Kit" in that the double-coated pressure-sensitive adhesive tape incorporates at least one strong, flexible thread of low elongation that extends parallel to and is spaced from the edges of the tape over its full length and can be pulled from the tape by the fingertips. After using the tape to mount an oversize piece of transparent plastic film across a window casement and then stretching and/or shrinking the film to tautness, excess plastic window film can be trimmed off by pulling the thread with ones fingertips, leaving a smooth edge and avoiding the damage that often has been incurred in prior efforts to use a razor or scissors to trim off the excess window film.

Like the double-coated pressure-sensitive adhesive tape of the aforementioned "Window Insulator Kit," that of the present invention has a disposable low-adhesion liner and a flexible carrier web, each major surface of which bears a layer of pressure-sensitive adhesive, the exposed layer of which is formulated to adhere strongly to typical window casement surfaces without becoming permanently bonded thereto, while the hidden layer is formulated to adhere strongly to transparent plastic window film.

Briefly, the double-coated pressure-sensitive adhesive tape of the invention differs from that of the "Window Insulator Kit" by bearing at least one strong, flexible thread of low elongation extending parallel to and spaced from the edges of the tape over the full length of the tape. By "strong" is meant a thread having a tensile strength of at least 0.1 N/tex, preferably at least 0.5 N/tex (ASTM D2101-91, the content whereof is incorporated herein by referance) and by "low elongation" is meant that the thread does not elongate more than 20% at break, preferably not more than 10%. By "flexible" is meant a thread that can be tied upon itself in a knot without breaking.

The term "thread" is here used to include any threadlike material and can be monofilament or have multiple strands. In order to cut plastic window film cleanly, the thread preferably is substantially circular in cross section and of sufficiently small diameter to cut plastic window film cleanly and yet not so small as to cut the user or to be difficult to manipulate. These objectives can be attained when the thread is from 3 to 16 mils (0.08 to 0.4 mm) in diameter, more preferably from 4 to 12 mils (0.1 to 0.3 mm)

Materials of which the thread of the novel pressure-sensitive adhesive tape can be made include natural fibers such as cotton, jute, hemp, flax, and silk; polymeric filaments such as polyesters, aramids, acrylics, polyimides, and polyamides; inorganic filaments such as glass; carbon and carbon/graphite filaments; and metal filaments.

The thread should be black or brightly colored to enable the user to locate its end. Then after pricking the plastic window film and lifting the end of the thread with a pointed instrument such as a pin or a knife, the user can pull the thread with his or her fingertips.

The window insulating kit of the invention preferably is manufactured in the same manner as disclosed in the above-cited Jorgensen Pat. No. 4,699,842 (disclosure of which is incorporated herein by reference). Hence, its transparent plastic window film preferably is polyethylene having a thickness of from 0.6 to 2.75 mils (0.015 to 0.07 mm), more preferably radiation-crosslinked, biaxially-oriented, blown polyethylene having a thickness of from 0.8 to 1.2 mil (0.02 to 0.03 mm). The adhesive layer which is to contact a window casement should be selected to adhere strongly to materials of which casements are made such as metal and coated wood, e.g., tackified rubber based and silicone based pressure-sensitive adhesives as taught at col. 3 of the Jorgensen patent. The adhesive layer which is to contact the transparent plastic window film preferably comprises a copolymer of terminally unsaturated monomers as taught in coassigned U.S. Pat. No. 4,629,663 (which is incorporated herein by reference).

Each adhesive layer of the novel double-coated pressure-sensitive adhesive tape preferably is as thin as will reliably form strong adhesive bonds, typically from 2 to 3 mils (0.05 to 0.075 mm). Substantially greater thicknesses would waste raw materials and interfere with the desirably slim profile of the mounted transparent plastic film, while substantially lesser thicknesses might not afford adequate adhesion. The carrier web should be thin for the same reasons, preferably from 0.8 to 1.2 mils (0.02 to 0.03 mm), and the overall thickness of the double-coated tape (exclusive of its disposable low-adhesion liner) preferably is from 4 to 8 mils (0.1 to 0.2 mm).

A preferred carrier web is biaxially oriented poly(ethyleneterephthalate) film. Other useful materials for the carrier web are disclosed in the Jorgensen patent.

Like that of the "Window Insulator Kit," that of the novel window insulating kit, the novel double-coated pressure-sensitive adhesive tape preferably is transparent and hence becomes almost invisible when used to mount the plastic window film. Description of the Preferred Embodiments The strong, flexible, low-elongation thread preferably is positioned to cut through the carrier web when it is pulled so that the excess plastic window film carries with it the underlying portion of the double-coated pressure-sensitive adhesive tape. Otherwise there would be dirt-attracting open adhesive at the edges of the trimmed plastic film. Hence, the thread preferably is (a) embedded in the exposed adhesive layer of the tape or (b) positioned between the carrier web and exposed adhesive layer or (c) embedded in the carrier web. In manufacturing the first of these three, the thread can be laid on the surface of the exposed adhesive, because when the tape is wound upon itself to form a roll, the compliance of the adhesive should allow the thread to become embedded into the adhesive layer.

Preferably, the tape is from 0.5 to 2 inch (1.25 to 5 cm) in width, and the thread is spaced from an edge of the tape by at least 5% of the width of the tape, preferably at least 10% [or at least 0.04 inch (1 mm)] so that the plastic window film is securely held against the tape while being cut by pulling the thread. Otherwise, the thread might simply lift the excess plastic film without cutting it. Preferably the thread is not spaced from the edge of the tape by more than 0.2 inch (5 mm) or by more than 30% of the width of the tape, thus leaving at least 70% of the tape in place to hold the plastic film.

When the novel tape has only one thread and the thread is not equally spaced between the tape edges, the user must be careful to orient the tape with the thread near the edge of the tape that is closer to the edge of the transparent plastic window film. To make it unnecessary to orient the tape correctly, the tape can have a pair of strong, flexible threads, each of which is close to one edge of the tape, e.g., spaced from the edge by 5–30% of the width of the tape. Then after using the tape to mount an oversize piece of transparent plastic film across a window casement and stretching and/or shrinking the film to tautness, the thread closest to the edge of the plastic film can be pulled, thus trimming off excess film while leaving the mounted film in contact with more than half of the width of the tape.

When the novel tape incorporates a pair of threads, they preferably are of equal diameter and each has the same close spacing from one edge of the tape. This allows the tape to be wound upon itself in a roll without telescoping. However, when the novel tape incorporates only one thread, the thread preferably is embedded in the flexible carrier web and its diameter substantially does not exceed the overall thickness of the tape so that it does not appreciably protrude beyond the surface of either of the pressure-sensitive adhesive layers. Otherwise, it would be difficult to wind the tape into a roll without telescoping.

Typically, the "Window Insulator Kit" of the prior art is furnished with a double-coated pressure-sensitive adhesive tape which is 0.5 inch (1.27 cm) in width. In the window insulating kit of the invention, part of the novel tape is trimmed off in use, so that it may be desirable to market the novel kit with tape of wider widths Instructions furnished with the "Window Insulator Kit" of the prior art indicate that its tape can be applied to the face of the window casement but preferably is applied to the outside edges of the casement. In the United States, the outside edges of many casement windows project only about 0.75 inch (1.9 cm) from the adjacent wall surface, so that it may be impractical to market a window insulating kit having a double-coated tape of more than 0.75 inch (1.9 cm) in width. Accordingly, it may be preferred to supply the novel double-coated tape in widths of from 0.6 inch (1.5 cm) to 0.75 inch (1.9 cm).

BRIEF DESCRIPTION OF THE DRAWING

In the drawing, all figures of which are schematic:

Referring to FIGS. 1 and 2, an oversize piece of flexible transparent plastic film 10 has been stretched across a window casement 12 and secured to the peripheral edge surfaces 11 of the window casement 12 by double-coated pressure-sensitive adhesive tape 14. Excess plastic film 15 and the underlying tape edge is shown being trimmed off by pulling a strong, flexible thread 16 that has been embedded in the tape close to one edge of the tape 14. Upon being adhered to the casement 12, the tape 14 has been oriented so that the thread 16 is adjacent the excess plastic film 15. The thread will be pulled until all of the excess plastic film 15 is trimmed off entirely around the window casement 12.

Figure 1:
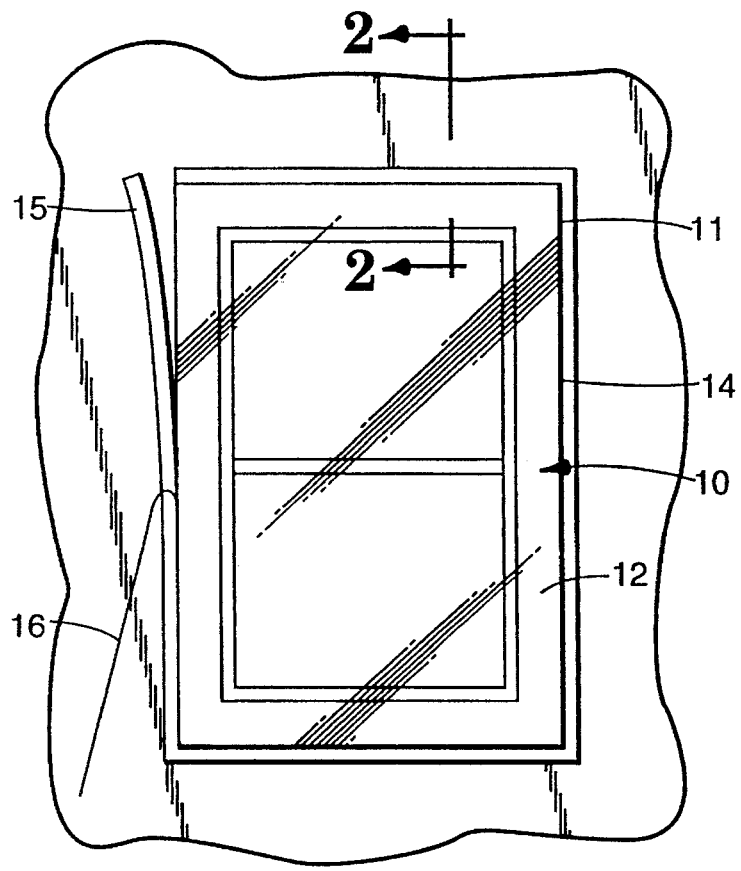
FIG. 1 is an elevation of a window casement across which an oversize piece of transparent plastic film has been mounted using a window insulating kit of the invention.
Figure 2:
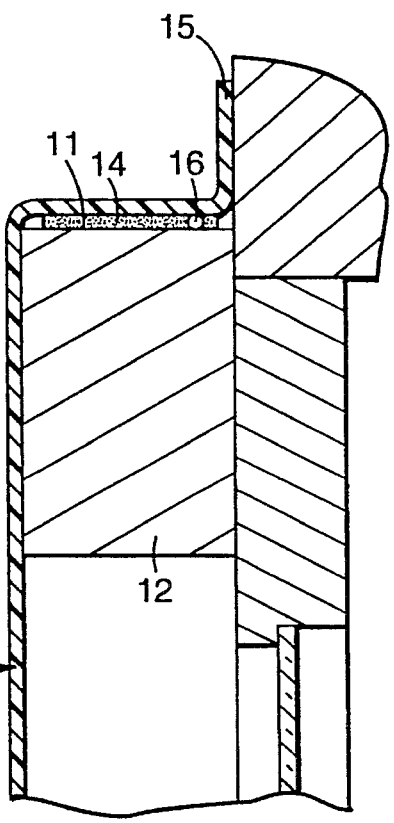
FIG. 2 is a section along line 2—2 of FIG. 1, greatly enlarged.
Figure 3:
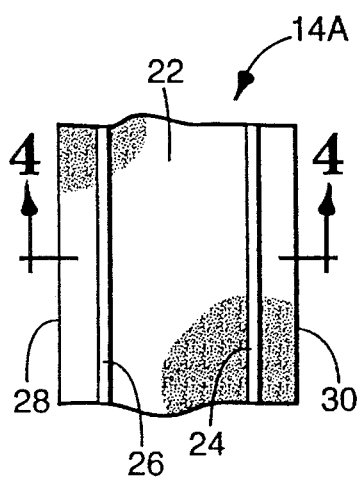
FIG. 3 is a plan view of a preferred double-coated pressure-sensitive adhesive tape of the invention, which tape differs slightly from the tape shown in FIGS. 1 and 2.
Figure 4:
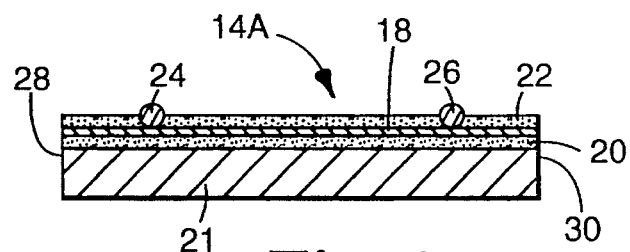
FIG. 4 is a section along line 4—4 of FIG. 3, greatly enlarged.

Shown in FIGS. 3 and 4 is a double-coated pressure-sensitive adhesive tape 14A of the invention that could have been used in place of the mounting tape 14 illustrated in FIGS. 1 and 2. The tape 14A has a flexible carrier web 18, each major surface of which is covered by a layer of pressure-sensitive adhesive. Of the adhesive layers, one adhesive layer 20 adheres strongly to transparent plastic window film (without becoming permanently bonded thereto) and is hidden by a disposable low-adhesion liner 21, while the other adhesive layer 22, which is exposed, adheres strongly to typical window casement surfaces. Embedded in the exposed adhesive layer 22 are a pair of strong, flexible threads 24 and 26 that extend the length of the tape parallel to and spaced from the tape edges 28 and 30, respectively, by about 20% of the width of the tape.

The tape 14A of FIGS. 3 and 4 differs from the tape 14 of FIGS. 1 and 2 only by having two strong, flexible threads 24 and 26 instead of a single thread 16.

Even though the threads 24 and 26 protrude from the surface of the exposed adhesive layer 22, the threads act like rails when the tape 14A is wound up into a roll and thus counteract any tendency of the tape to telescope. Furthermore, the cummulative winding tension tends to force the threads into the tape.

EXAMPLE

A double-coated pressure-sensitive adhesive tape of a commercial "Window Insulator Kit" has been modified as shown in FIGS. 3 and 4 by laying onto its exposed pressure-sensitive adhesive layer 22 a pair of strong, flexible threads, each consisting of glass fibers and having a diameter of about 6 mils (0.015 mm). Each of the threads was spaced from the edges of the tape by about 20% of the ½-inch width of the tape. The thus-modified tape was then wound upon itself. After about 7 days at ordinary room temperature, the roll had not telescoped. Upon being unwound, close examination revealed that the threads protruded from, but had become embedded into the tape.

Strips of the modified adhesive tape were used to mount an oversize piece of the transparent plastic film across the casement of a window. After a day at room temperature, a heat gun was used to shrink the transparent film to tautness. An end of the embedded thread of each strip which was closest to the edge of the transparent film was lifted with the point of a razor blade and grasped by fingertips. Upon being pulled, the thread trimmed the excess film smoothly without leaving any residue of tape beyond the newly created edge of the plastic window film.

Although the double-coated pressure-sensitive adhesive tape of the invention is primarily useful in a window insulation kit, it should have other uses, e.g., to trim masking tape or sheets or to trim a surgical drape. In another use, it may be desirable to cover an object with a masking sheet or wrapping paper that is formed with an opining to expose a portion of the object. By preapplying the novel tape around said portion to be exposed, a thread of the tape can be pulled to trim the edges of the opening with precision.

What is claimed is:

1. A double-coated pressure-sensitive adhesive tape comprising an elongate flexible carrier web, a layer of pressure-sensitive adhesive covering each major surface of the carrier web, one of said layers of pressure-sensitive adhesive being protected by a disposable low-adhesion liner, leaving the other layer exposed, and at least one strong, flexible thread of low elongation embedded in the tape adjacent one major surface of the carrier web and extending parallel to and spaced from the edges of the tape over its full length, the physical properties of said thread, carrier web, and layers of adhesive causing the thread to cut through the carrier web along its length when the layer of adhesive along said one surface is adhered to a substrate and one end of the thread is pulled away from the substrate.

2. A pressure-sensitive adhesive tape as defined in claim 1, which tape is wound upon itself into a roll and comprises no more than two of the strong, flexible threads.

3. A pressure-sensitive adhesive tape as defined in claim 1 wherein said at least one thread is monofilament.

4. A pressure-sensitive adhesive tape as defined in claim 1 wherein the thread comprises polymeric filaments.

5. A pressure-sensitive adhesive tape as defined in claim 1 wherein said at least one thread is embedded in the exposed adhesive layer of the tape.

6. A double-coated pressure-sensitive adhesive tape comprising an elongate flexible carrier web having opposite first and second major surfaces, a first layer of pressure-sensitive adhesive on said first major surface of the carrier web which can adhere strongly to transparent plastic film, a second layer of pressure sensitive adhesive on said second major surface which can adhere strongly to metal and coated wood from which it can be cleanly peeled, one of said layers of pressure-sensitive adhesive being protected by a disposable low-adhesion liner, leaving said other layer exposed, and at least one strong, flexible thread of low elongation embedded in the tape adjacent the second major surface of the carrier web and extending parallel to and spaced from the edges of the tape over its full length, the physical properties of said thread, carrier web, and layers of adhesive causing the thread to cut through the carrier web along its length when said second layer of adhesive is adhered to a metal or wood substrate and one end of the thread is pulled away from the substrate.

7. A pressure-sensitive adhesive tape as defined in claim 6 wherein the tensile strength of the thread is at least 0.5 N/tex. of the width of the tape.

8. A pressure-sensitive adhesive tape as defined in claim 6 wherein the thread is spaced from 1 to 5 mm from an edge of the tape.

9. A pressure-sensitive adhesive tape as defined in claim 6 wherein the thread is substantially circular in cross section.

10. A pressure-sensitive adhesive tape as defined in claim 9 wherein the tape has an overall thickness of from 0.1 to 0.2 mm and the thread is from 0.08 to 0.4 mm in diameter.

11. A pressure-sensitive adhesive tape as defined in claim 9 wherein the diameter of the thread substantially does not exceed the overall thickness of the tape so that it does not appreciably protrude beyond the surface of either of the pressure-sensitive adhesive layers.

12. A pressure-sensitive adhesive tape as defined in claim 6 wherein the thread does not elongate more than 20% at break.

13. A pressure-sensitive adhesive tape as defined in claim 6 comprising no more than two of the strong, flexible threads.

14. A pressure-sensitive adhesive tape as defined in claim 13 wherein each of said threads is spaced from an edge of the tape by 5–30% of the width of the tape.

15. A pressure-sensitive adhesive tape as defined in claim 13 and having a width of from 1.5 to 1.9 cm.

16. A pressure-sensitive adhesive tape as defined in claim 6 wherein the thread is black or brightly colored.

17. A window insulating kit comprising a piece of flexible transparent plastic film and a double coated pressure-sensitive adhesive tape comprising an elongate flexible carrier web having opposite first and second major surfaces, a first layer of pressure-sensitive adhesive on said first major surface of the carrier web which can adhere strongly to transparent plastic film, a second layer of pressure sensitive adhesive on said second major surface which can adhere strongly to metal and coated wood from which it can be cleanly peeled, one of said layers of pressure-sensitive adhesive being protected by a disposable low-adhesion liner, leaving said other layer exposed, and at least one strong, flexible thread of low elongation embedded in the tape adjacent the second major surface of the carrier web and extending parallel to and spaced from the edges of the tape over its full length, the physical properties of said thread, carrier web, and layers of adhesive causing the thread to cut through the carrier web along its length when said second layer of adhesive is adhered to a metal or wood substrate and one end of the thread is pulled away from the substrate.

18. A window insulating kit as defined in claim 17 wherein the thread is positioned to cut through the carrier web when the tape is used to mount an oversize piece of transparent plastic film to a window casement and the thread is pulled, so that the excess plastic window film carries with it the underlying portion of the double-coated tape.

19. A window insulating kit as defined in claim 17 wherein the pressure-sensitive adhesive tape bears no more than two of the strong, flexible threads, and each of said threads is spaced from an edge of the tape by 5–30% of the width of the tape.

20. A window insulating kit as defined in claim 19 wherein in the pressure-sensitive adhesive tape each of the threads is embedded in, but protrudes from, said exposed adhesive layer.

* * * * *